(12) United States Patent
Magaziner

(10) Patent No.: US 9,103,346 B1
(45) Date of Patent: Aug. 11, 2015

(54) HOUSEHOLD FAN FOR PROVIDING THE FEEL OF A NATURAL BREEZE

(71) Applicant: Russell Scott Magaziner, Hickory, NC (US)

(72) Inventor: Russell Scott Magaziner, Hickory, NC (US)

( * ) Notice: Subject to any disclaimer, the term of this patent is extended or adjusted under 35 U.S.C. 154(b) by 340 days.

(21) Appl. No.: 13/624,903

(22) Filed: Sep. 22, 2012

Related U.S. Application Data

(60) Provisional application No. 61/542,199, filed on Oct. 2, 2011.

(51) Int. Cl.
| | |
|---|---|
| *F04D 27/00* | (2006.01) |
| *F04D 25/08* | (2006.01) |
| *F24F 11/00* | (2006.01) |

(52) U.S. Cl.
CPC .............. *F04D 27/00* (2013.01); *F04D 27/004* (2013.01); *F24F 11/0079* (2013.01); *F04D 25/08* (2013.01); *F04D 25/088* (2013.01); *F24F 11/0076* (2013.01); *F24F 2011/0064* (2013.01)

(58) Field of Classification Search
CPC .............. F24F 11/0076; F24F 11/0079; F24F 2011/0064; F04D 25/08; F04D 25/10; F04D 25/105; F04D 27/00; F04D 27/004; F04D 25/088
USPC .......................... 417/12, 44.11, 45, 423.1, 411
See application file for complete search history.

(56) References Cited

U.S. PATENT DOCUMENTS

| | | | |
|---|---|---|---|
| 3,935,522 A | 1/1976 | Tsay | |
| 4,689,533 A | 8/1987 | Yang | |
| 5,432,696 A | 7/1995 | Kim | |
| 5,436,827 A | 7/1995 | Gunn | |
| 5,731,671 A | 3/1998 | Adam | |
| 5,847,526 A | 12/1998 | Lasko | |
| 5,887,785 A | 3/1999 | Yilmaz | |
| 6,120,262 A * | 9/2000 | McDonough et al. | ...... 417/424.1 |
| 6,782,579 B1 | 8/2004 | Grimm | |
| 7,330,004 B2 | 2/2008 | DeJonge | |
| 7,489,094 B2 | 2/2009 | Steiner | |
| 7,777,442 B2 | 8/2010 | Martins | |
| 8,348,629 B2 | 1/2013 | Fitton | |
| 2006/0130497 A1* | 6/2006 | Kang et al. | ....................... 62/127 |
| 2007/0130969 A1* | 6/2007 | Peterson et al. | ................. 62/178 |
| 2009/0297360 A1 | 12/2009 | De Rosa | |
| 2010/0316501 A1* | 12/2010 | Bain | .............................. 416/246 |
| 2014/0023495 A1 | 1/2014 | Huang | |
| 2014/0119924 A1 | 5/2014 | Hiner | |

* cited by examiner

*Primary Examiner* — Alexander Comley
*Assistant Examiner* — Christopher Brunjes

(57) ABSTRACT

A household fan for providing the feel of a natural breeze includes a motorized impeller for providing airflow, a controller coupled to the motorized impeller for changing characteristics of the airflow, and an interface in communication with the controller for receiving human instructions. The fan further includes a breeze setting to be selected by way of the interface and implemented via the controller to operate the motorized impeller. The breeze setting varies intensity of the airflow that is output by the motorized impeller such that local extrema of the intensity are related to numbers selected by way of random number generation within a bounded range or numbers drawn from a sequence of substantially non-consecutive numbers.

21 Claims, 4 Drawing Sheets

HOUSEHOLD FAN FOR PROVIDING THE FEEL OF A NATURAL BREEZE

RELATED APPLICATIONS

This application claims the benefit of U.S. Provisional Application No. 61/542,199 filed Oct. 2, 2011, which is incorporated by reference herein in its entirety.

BACKGROUND

Aspects of the present disclosure generally relate to fans, such as household fans that may be used to cool occupants of a home, business, or other venue.

A fan typically includes a motor (e.g., electric motor, engine) that drives an impeller (e.g., fan blades, motivator, paddles, turbine, compressor) of a fluid, such as air. Some fans change rates of output, such as by changing the power supplied to the motor (e.g., via potentiometer, variable resistors and switches) or by way of mechanical components (e.g., a gear reduction, transmissions).

Household fans typically blow cooling air on occupants of the venue. Some such fans operate at controlled rates, such as at a constant-speed setting and, in some cases, with a repeating oscillatory swivel of the fan direction. However, in Applicant's opinion, conventional household fans do not replicate well the feel of breezes in nature. A need exists for a fan that more accurately reflects the feel of natural breezes, which may provide a desirable cooling experience.

SUMMARY

Aspects of the innovations include a fan that blows like natural wind, with gusts and different intensities at varying time intervals. The fan is intended to provide a comfortable, close-to-nature environment.

Some embodiments relate to a household fan for providing the feel of a natural breeze. The fan includes a motorized impeller for providing airflow, a controller coupled to the motorized impeller for changing one or more characteristics of the airflow, and an interface in communication with the controller for receiving human instructions for the controller. The fan further includes a breeze setting to be selected by way of the interface and implemented via the controller to operate the motorized impeller. The breeze setting varies at least one of the characteristics of the airflow, where one of the characteristics varied via the breeze setting is intensity of the airflow that is output by the motorized impeller. In the breeze setting, local extrema of the intensity are related to numbers selected by way of random number generation within a bounded range or numbers drawn from a sequence of substantially non-consecutive numbers.

Other embodiments of the invention relate to a household fan for providing the feel of a natural breeze. The household fan includes a motorized impeller for providing airflow, a controller coupled to the motorized impeller for changing one or more characteristics of the airflow, and an interface in communication with the controller for receiving human instructions for the controller. The household fan further includes a breeze setting to be selected by way of the interface and implemented via the controller to operate the motorized impeller. The breeze setting varies at least one of the characteristics of the airflow. More specifically, the household fan is a swivel fan 210 (FIG. 2) and one of the characteristics varied via the breeze setting is direction of the airflow that is output by the motorized impeller. In the breeze setting, the direction of the airflow is related to numbers selected by way of random number generation within a bounded range or numbers drawn from a sequence of substantially non-consecutive numbers.

Still other embodiments of the invention relate to a household fan for providing the feel of a natural breeze. The household fan includes a motorized impeller for providing airflow, a controller coupled to the motorized impeller for changing one or more characteristics of the airflow, and an interface in communication with the controller for receiving human instructions for the controller. The household fan further includes a breeze setting to be selected by way of the interface and implemented via the controller to operate the motorized impeller. The breeze setting varies at least one of the characteristics of the airflow. One of the characteristics varied via the breeze setting is intensity of the airflow that is output by the motorized impeller. The breeze setting further includes variation in periods of time between local peaks in intensity of the airflow.

BRIEF DESCRIPTION OF THE FIGURE

The disclosure will become more fully understood from the following detailed description, taken in conjunction with the accompanying figure, wherein like reference numerals refer to like elements, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Figure 1:
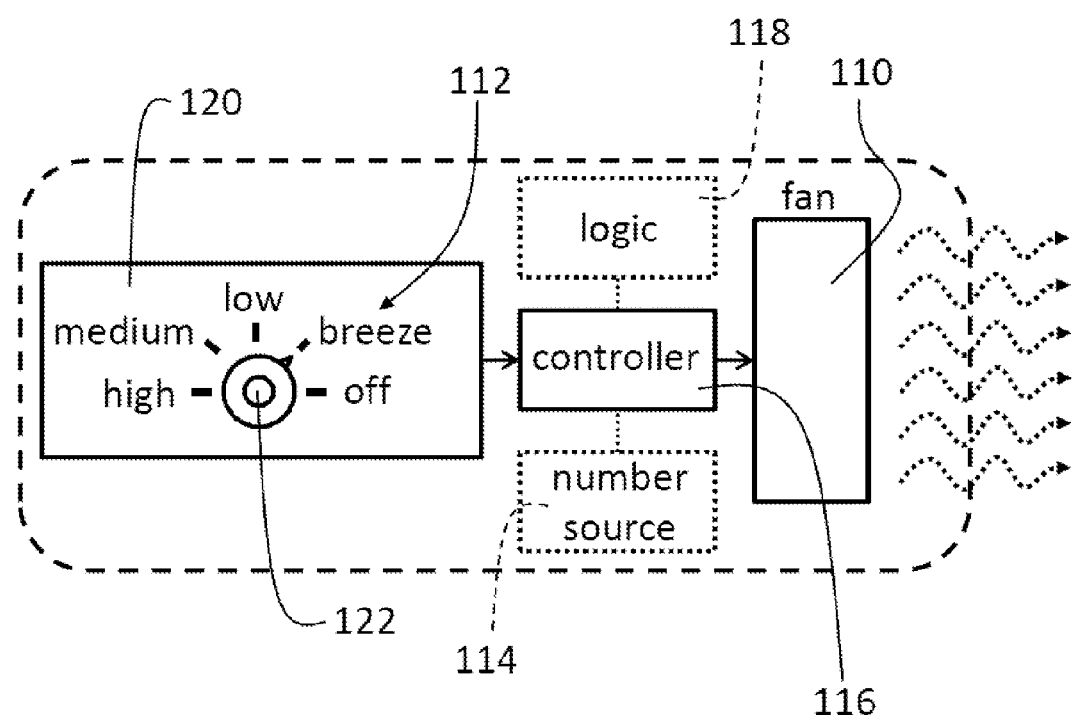
FIGS. 1 to 4 are schematic views of a fan according to exemplary embodiments.
Figure 2:
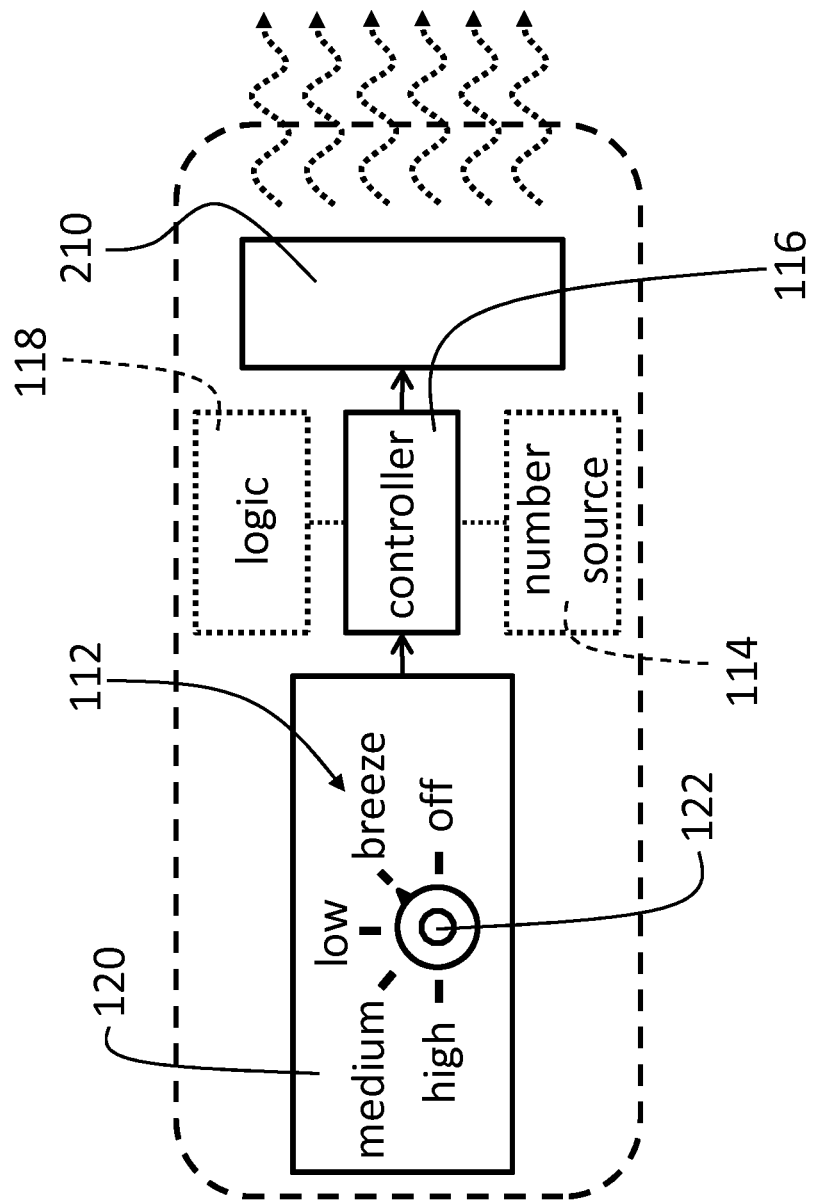
Figure 3:
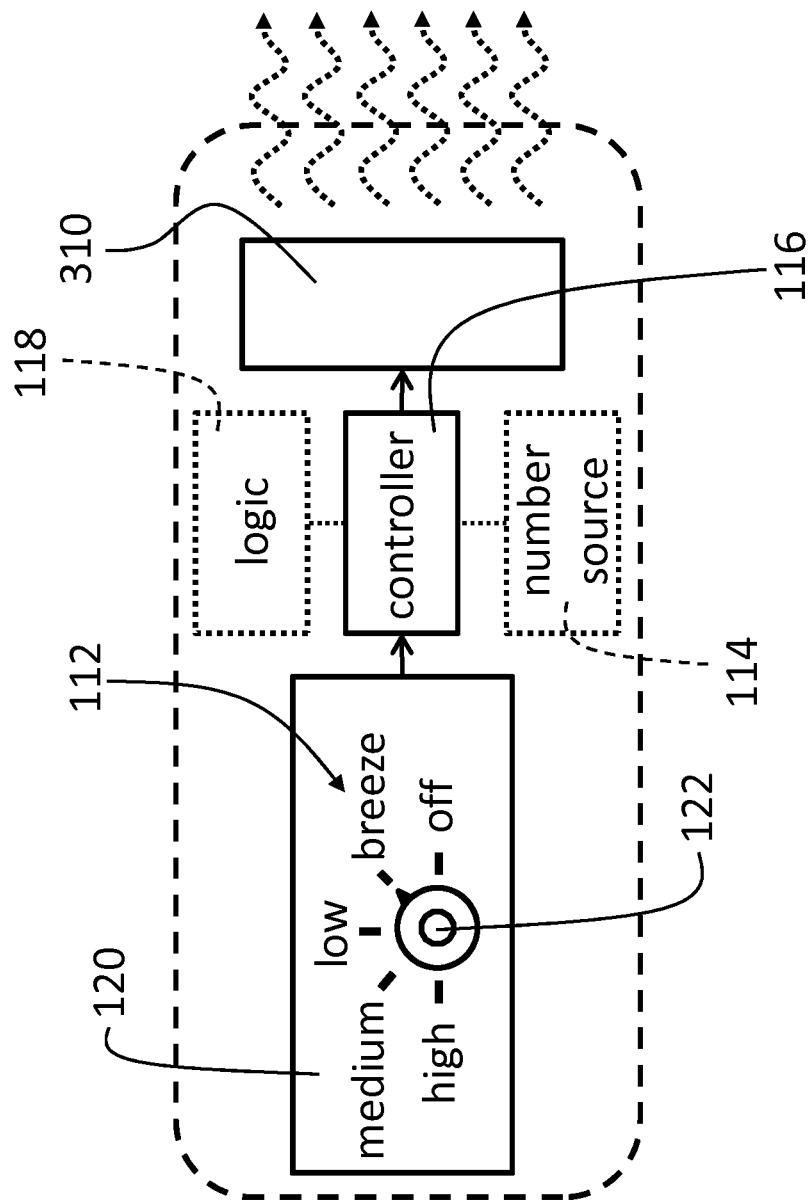
Figure 4:
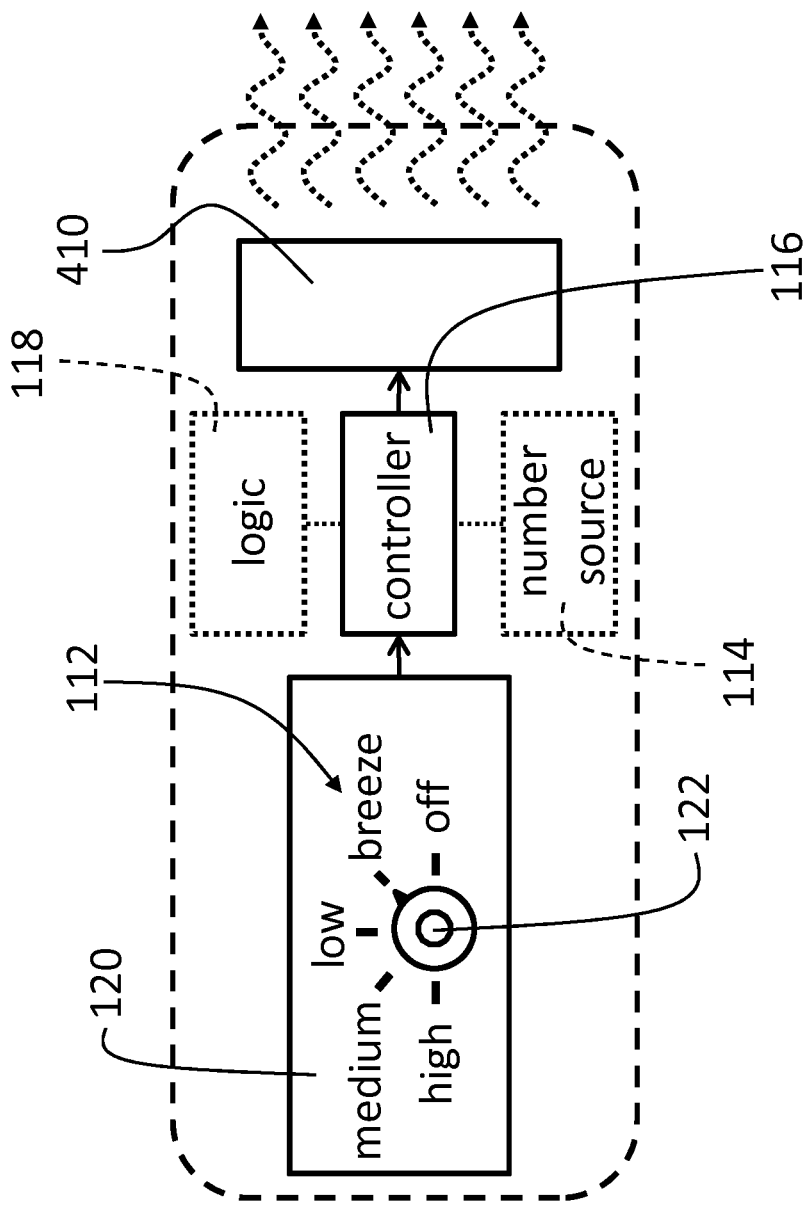

A house fan 110 (i.e., household fan), such as a portable fan 310 (FIG. 3) or ceiling fan 410 (FIG. 4), includes a setting 112 that provides randomized intensity (or seemingly random-patterned) to the fan 110. The random intensity may be intended to simulate the feel of a natural breeze. As such, the random changes to the intensity may be smoothly adjusting and within a bounded range, such as the range from off to high-setting of the fan 110. In one embodiment, a random number generator (see, e.g., source 114) provides two numbers per cycle. One of the numbers corresponds to the length of the cycle from local maxima (i.e., peak) to local maxima (i.e., next peak), such as between one and ten seconds, and the other number corresponds to the intensity of the fan 110 during the cycle. A smooth interpolation scheme, such as spline or Runge-Kutta, may be used to provide the curve between intensities and between cycles. According to an exemplary embodiment, a user may scale the random setting 112 so that higher or lower intensities are given increased weight in the random number generator. In still other embodiments the random number generator is used to control the turning direction or rotational angle of an oscillating fan 110.

According to an exemplary embodiment, a controller 116 for a fan 110, is coupled to or includes (e.g., comprises) a source 114 of random or pseudo-random numbers, such as a set of at least 20, at least 50, at least 1000 substantially out-of-sequence numbers, which may include some subsets of sequential number, as may be present in a set of random numbers. The controller 116 further includes logic 118 configured to use a first of the numbers to provide an amount of intensity for operation of a fan 110 and a second of the numbers to provide a time period corresponding to the intensity. In some such embodiments of the controller 116, the logic 118 selects another two numbers for a second intensity and second time period. In some of those embodiments, the logic 118 connects the first and second intensities by shifting from the first to the second intensity in a smooth, continuous (non-discrete) manner.

According to an exemplary embodiment, a fan 110 includes an interface 120 that provides an option to select a setting 112 of the fan 110, which includes a random or pseudo-random string of intensity. The intensity of the fan 110 may appear random, and may be formed from a large enough set of changes in intensity that repetition would not be anticipated by a human observer, such as a set of at least 1000 changes. Such a setting 112 is intended to provide the feel of a natural breeze. In some such embodiments, the interface 120 of the fan 110 includes a feature 122 to weight (e.g., scale, amplify, bias) the random or pseudo-random setting 112, resulting in a change in average intensity for the random or pseudo-random setting 112. As such, the weighting causes the output of the fan 110 to correspond to a windier or less-windy natural breeze.

In some embodiments, the fan 110 (e.g., luxury fan) includes a remote control with a wind mode (e.g., random).

The construction and arrangements of the fan, as shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A household fan for providing the feel of a natural breeze, comprising:
   a motorized impeller for providing airflow;
   a controller coupled to the motorized impeller for changing one or more characteristics of the airflow;
   an interface in communication with the controller for receiving human instructions for the controller; and
   a breeze setting to be selected by way of the interface and implemented via the controller to operate the motorized impeller,
      wherein the breeze setting varies at least one of the characteristics of the airflow,
      wherein one of the characteristics varied via the breeze setting is intensity of the airflow that is output by the motorized impeller,
      wherein, in the breeze setting, local extrema of the intensity are related to numbers selected by way of random number generation within a bounded range or numbers drawn from a sequence of substantially non-consecutive numbers, and
      wherein the breeze setting varies the intensity of the airflow of the fan along a smooth transition curve between the local extrema.

2. The household fan of claim 1, wherein the fan is a swivel fan and another of the characteristics of the airflow varied via the breeze setting is direction of the airflow that is output by the motorized impeller.

3. The household fan of claim 2, wherein at least one of the breeze setting and another setting of the swivel fan changes the direction of the airflow such that the direction of the airflow is related to numbers selected by way of random number generation within a bounded range or numbers drawn from a sequence of substantially non-consecutive numbers.

4. The household fan of claim 1, wherein the breeze setting further includes variation in periods of time between local peaks in intensity of the airflow.

5. The household fan of claim 4, wherein the periods of time are related to numbers selected by way of random number generation within a bounded range or numbers drawn from a sequence of substantially non-consecutive numbers.

6. The household fan of claim 1, wherein the interface includes a feature to weight the output during the breeze setting, thereby changing average intensity of the airflow for the breeze setting.

7. The household fan of claim 1, wherein, in the breeze setting, local extrema of the intensity are related to numbers selected by way of random number generation within a bounded range, and wherein the bounded range of random number generation includes limits of zero airflow to a maximum intensity of the fan.

8. The household fan of claim 1, wherein, in the breeze setting, local extrema of the intensity are related to numbers drawn from a sequence of substantially non-consecutive numbers, and wherein the sequence of substantially non-consecutive numbers comprises at least 20 numbers.

9. The household fan of claim 1, wherein, in the breeze setting, local extrema of the intensity are related to numbers drawn from a sequence of substantially non-consecutive numbers, and wherein the sequence of substantially non-consecutive numbers comprises at least 1000 numbers.

10. The household fan of claim 1, wherein the fan is a portable fan.

11. The household fan of claim 1, wherein the fan is a ceiling fan.

12. A household fan for providing the feel of a natural breeze, comprising:
    a motorized impeller for providing airflow;
    a controller coupled to the motorized impeller for changing one or more characteristics of the airflow;
    an interface in communication with the controller for receiving human instructions for the controller; and
    a breeze setting to be selected by way of the interface and implemented via the controller to operate the motorized impeller,
       wherein the breeze setting varies at least one of the characteristics of the airflow,
       wherein one of the characteristics varied via the breeze setting is intensity of the airflow that is output by the motorized impeller,
       wherein, in the breeze setting, local extrema of the intensity are related to numbers selected by way of random number generation within a bounded range or numbers drawn from a sequence of substantially non-consecutive numbers, and
       wherein the interface includes a feature to weight the output during the breeze setting, thereby changing average intensity of the airflow for the breeze setting.

13. The household fan of claim 12, wherein the breeze setting varies the intensity of the airflow of the fan along a smooth transition curve between the local extrema.

14. The household fan of claim 12, wherein the fan is a swivel fan and another of the characteristics of the airflow varied via the breeze setting is direction of the airflow that is output by the motorized impeller.

15. The household fan of claim 14, wherein at least one of the breeze setting and another setting of the swivel fan changes the direction of the airflow such that the direction of the airflow is related to numbers selected by way of random number generation within a bounded range or numbers drawn from a sequence of substantially non-consecutive numbers.

16. The household fan of claim 12, wherein the breeze setting further includes variation in periods of time between local peaks in intensity of the airflow.

17. The household fan of claim 16, wherein the periods of time are related to numbers selected by way of random number generation within a bounded range or numbers drawn from a sequence of substantially non-consecutive numbers.

18. The household fan of claim 12, wherein, in the breeze setting, local extrema of the intensity are related to numbers selected by way of random number generation within a bounded range, and wherein the bounded range of random number generation includes limits of zero airflow to a maximum intensity of the fan.

19. The household fan of claim 12, wherein, in the breeze setting, local extrema of the intensity are related to numbers drawn from a sequence of substantially non-consecutive numbers, and wherein the sequence of substantially non-consecutive numbers comprises at least 20 numbers.

20. The household fan of claim 12, wherein the fan is a portable fan.

21. The household fan of claim 12, wherein the fan is a ceiling fan.

* * * * *